E. J. ROHNE.
ELECTRIC VULCANIZER.
APPLICATION FILED NOV. 21, 1919.
1,426,603.
Patented Aug. 22, 1922.
2 SHEETS—SHEET 1.
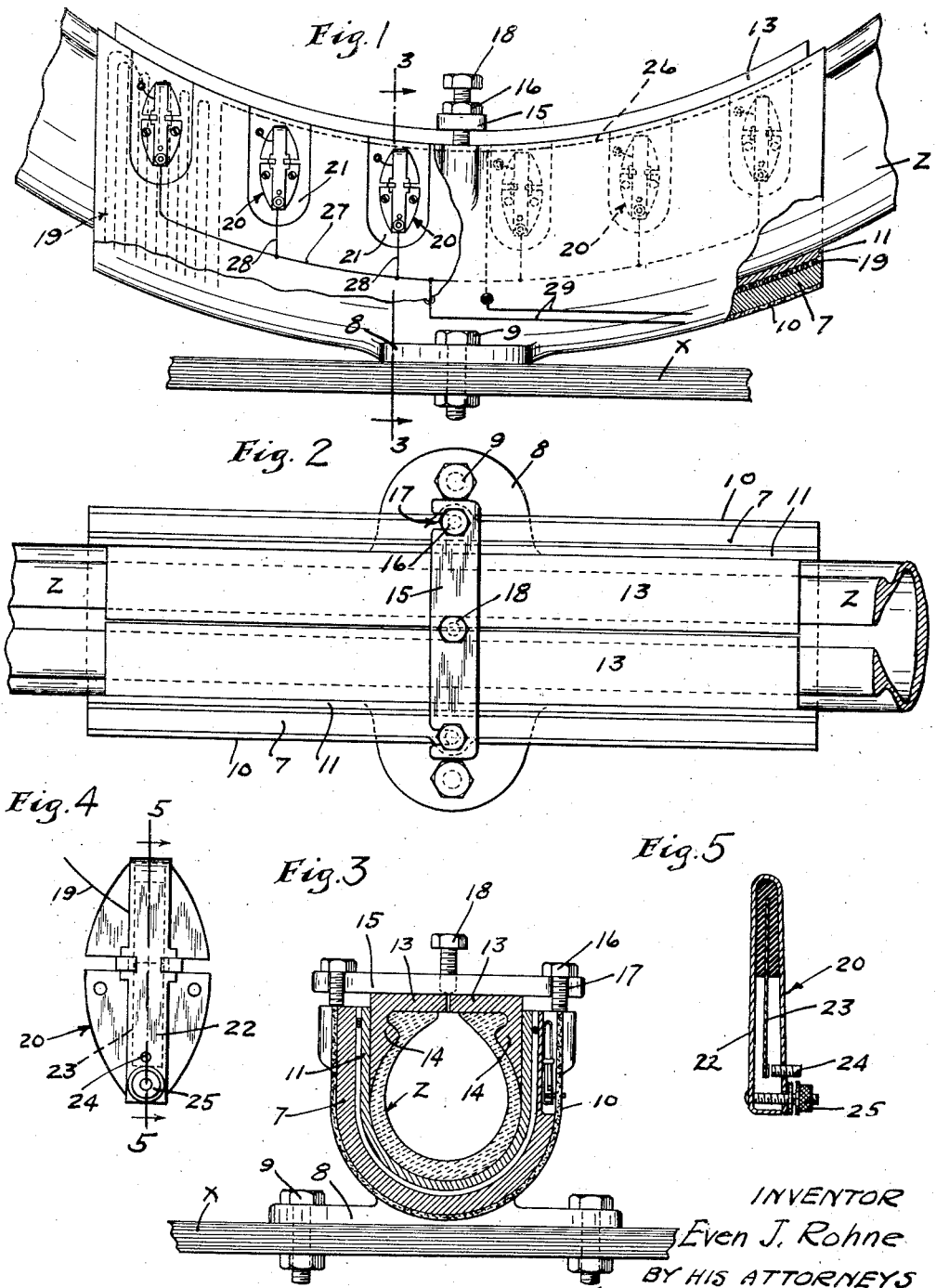
INVENTOR
Even J. Rohne
BY HIS ATTORNEYS

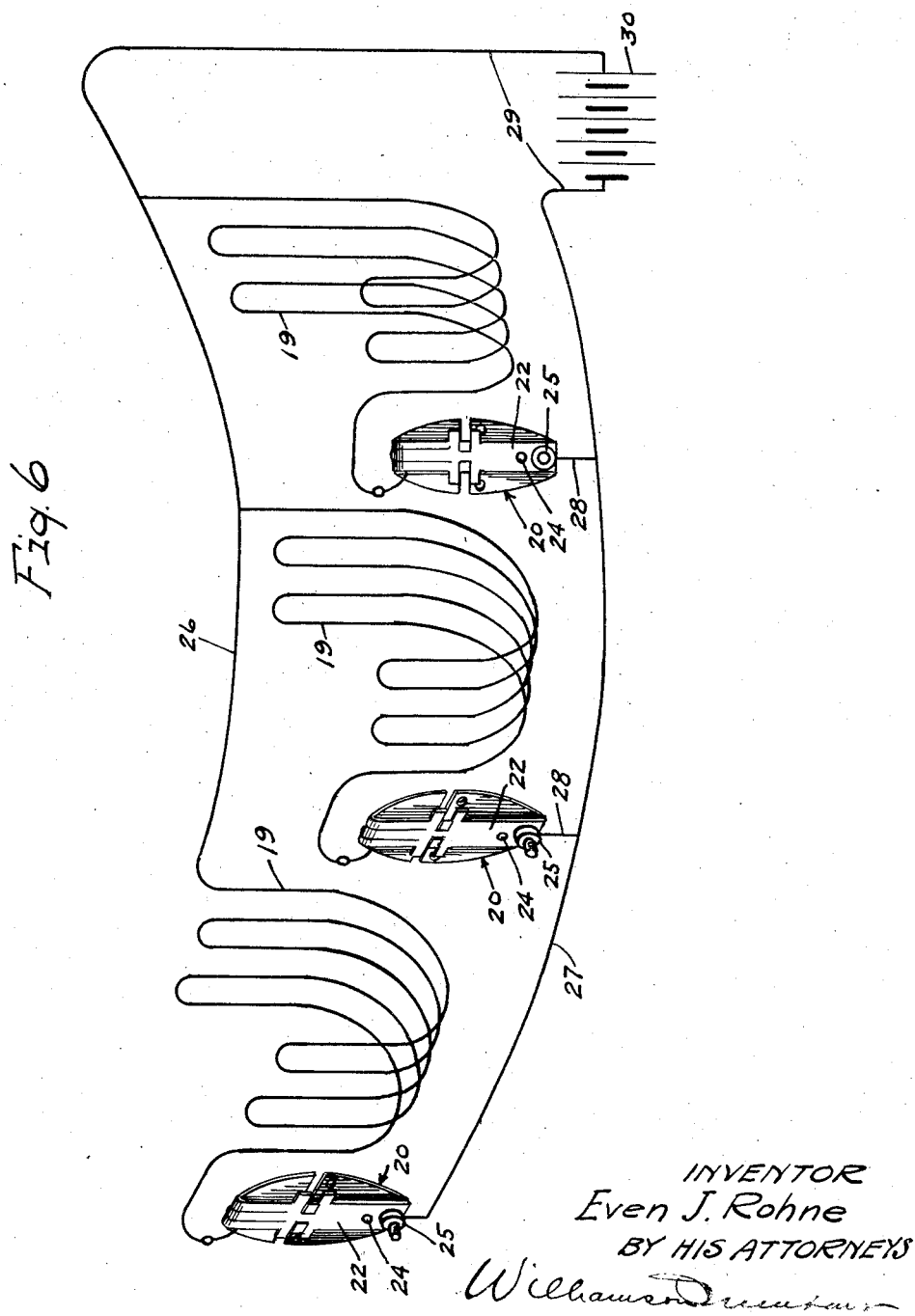

UNITED STATES PATENT OFFICE.

EVEN J. ROHNE, OF MINNEAPOLIS, MINNESOTA, ASSIGNOR OF ONE-HALF TO OLE KR. BOE, OF MINNEAPOLIS, MINNESOTA.

ELECTRIC VULCANIZER.

1,426,603.  Specification of Letters Patent.  Patented Aug. 22, 1922.

Application filed November 21, 1919. Serial No. 339,668.

*To all whom it may concern:*

Be it known that I, EVEN J. ROHNE, a citizen of the United States, residing at Minneapolis, in the county of Hennepin and State of Minnesota, have invented certain new and useful Improvements in Electric Vulcanizers; and I do hereby declare the following to be a full, clear, and exact description of the invention, such as will enable others skilled in the art to which it appertains to make and use the same.

My invention relates to improvements in electric vulcanizers especially adapted for use in vulcanizing pneumatic tire casings, and to this end, generally stated, it consists of the novel devices, and combinations of devices, hereinafter described and defined in the claims.

In the accompanying drawings, which illustrate the invention, like characters indicate like parts throughout the several views.

Referring to the drawings:

Fig. 1 is a side elevation of the improved vulcanizer to which is applied, a pneumatic tire casing, some parts being broken away and other parts being shown in circumferential section;

Fig. 2 is a plan view of the parts shown in Fig. 1;

Fig. 3 is a view in transverse section, taken on the line 3—3 of Fig. 1;

Fig. 4 is a plan view of one of the thermostats;

Fig. 5 is a longitudinal section taken on a line 5—5 of Fig. 4; and

Fig. 6 is a fragmentary view in diagram showing certain of the heating elements, thermostats and the wiring therefor.

The improved vulcanizer includes a segmental shoe 7, that is U-shaped in cross section and supported in an upright position on an integrally formed base 8, which extends outward on each side thereof and is provided with bores that are aligned with bores in a table top bench or other support and through which bores nut equipped bolts 9 extend to rigidly secure said shoe to its support. Preferably, as shown, the shoe 7 is covered with a non-heat conducting casing 10 of asbestos or other suitable material.

Removably mounted in the shoe 7 is a correspondingly formed liner 11 adapted to receive and hold that portion of a pneumatic tire casing Z to be vulcanized. The shoe 7, and its liner 11, may be made of any suitable metal, or metals, for instance, said shoe may be formed from cast iron and its liner formed from aluminum or other metal that will transmit heat quickly. It will be noted that the shoe 7 is considerably thicker than its liner 11 to reduce the escape or radiation of heat.

A pair of edgewise spaced segmental covered plates 13 are provided to rest upon the beads of the casing Z, as shown in Fig. 3. On the outer edges of the cover plates 13 are integrally formed filler strips 14 which fit between the inner wall of the liner 11 and the casing Z and closely follow the contours of the engaged portions of said casing to hold the same in their proper form. The cover plates 13 are held in position by a clamping bar 15, which in turn, is secured at its ends to the upper edges of shoe 7 by nut equipped bolts 16 which extend through notches 17 formed in one of the longitudinal edges of said clamping bar and have screw threaded engagement with said shoe. An adjusting screw 18 has screw threaded engagement with the intermediate portion of the clamping bar 15 and its inner end extends slightly between the adjacent edges of the cover plates 13 with a wedgelike action to separate and hold said cover plates and their filler strips 14 against the inner walls of the liner 11.

It is, of course, understood that the shoe 7, liner 11, cover plates 13, and filler strips 14 will have to be made in various different sizes and shapes to fit different sized tires.

Interposed between the shoe 7 and liner 11 is a series of heating elements 19, and a corresponding series of thermostats 20 are mounted in individual pockets 21, which, as shown, are formed in the outer face of shoe 7 but, of course, said thermostats may be mounted if desired between said shoe and liner. Each heating element 19 is in the form of an insulated single wire preferably wrapped with a suitable insulating material and folded back and forth transversely of and within the shoe 7. After the heating elements 19 have been properly positioned within the shoe 7, the liner 11 is placed therein and supported directly on the several series of heating elements. If found desirable, the heating elements 19 may be held in position in the shoe 7 with plastic or other suitable material.

The thermostat 20 may be of any well known type having contacts for opening and closing a circuit. For the purpose of this case it is sufficient to say that the thermostats are normally closed and each thereof comprises a contact member 22 in the form of a casing and a thermally actuated contact member 23 in the form of a tongue located within and insulated from said contact member 22. Co-operating with the contact member 23 is an adjustable pin 24 having screw thread engagement with the contact member 22, forms a part thereof and with which the thermally actuated contact member 23 normally engages. A binding post 25 is secured to the contact member 22. As shown, the thermostats 20 are secured in the pockets 21 by small screws. Obviously by adjusting the pins 24, the degree of heat at which the thermostats will open may be varied at will.

One end of each heating element 19 is connected to the contact member 23 of the respective thermostat 20, and the other end of said heating element is connected to an insulated bus wire 26. The contact members 22 of the thermostats 20 are independently connected to an insulated bus wire 27 by short wires 28 attached to the binding post 25. Two main line wires 29 leading from a battery 30, or other suitable source of electrical energy are extended through insulated openings in one side of the shoe 7 and connected one to each of the bus wires 26 and 27.

By providing the improved vulcanizer with a series of heating elements, each of which covers a transverse zone of the liner 11, and controlling each of said heating elements with a normally closed thermostat it is possible to even heat the vulcanizer throughout its entire length, and in case one of the zones becomes too hot the respective thermostat will automatically cut out the heating element with which it is associated. In case the heat in the cutout zone drops below the required heat said thermostat will again close and bring into action the connecting heating element.

From the above description it is evident that a tire casing will be very quickly applied to, or removed from, the improved vulcanizer. In case of repairs, the liner may be removed to expose the heating elements and their several electrical connections, or a portion of the casing 10 may be removed to expose the thermostats and their several electrical connections.

What I claim is:

1. An electric vulcanizer including two circuit leads, a series of independent heating elements connected to one of said leads, and a corresponding series of normally closed thermostats independently connecting the several heating elements to the other of said leads.

2. An electric vulcanizer including two bus wires, two circuit line wires attached one to each of the bus wires, a series of independent heating elements connected to one of said line wires, and a corresponding series of normally closed thermostats independently connecting the several heating elements to the other of said line wires.

3. In a vulcanizer for pneumatic tires the combination with a shoe and a removable liner therefor, of an automatically controlled heating element interposed between the shoe and liner, and circuit leads connected to the heating element.

4. In a vulcanizer for pneumatic tires, the combination with a shoe and a liner therefor, of two bus wires, two circuit line wires attached one to each of the bus wires, a series of independent heating elements interposed between the shoe and liner and connected to one of the bus wires, and a corresponding series of normally closed thermostats independently connecting the several heating elements to the other bus wire.

5. In a vulcanizer for pneumatic tires, the combination with a shoe and a liner therefor, of a series of normally closed thermostats, two bus wires, two circuit line wires attached one to each of the bus wires, a series of heating elements corresponding in number to the thermostats and each thereof comprising an insulated wire folded back and forth transversely between the shoe and liner and having one of its ends connected to one of the bus wires and its other end connected to one of the terminals of one of the thermostats, the other terminals of said thermostats being connected to the other bus wires.

6. In a vulcanizer for pneumatic tires the combination with a shoe and a removable liner therefor, said shoe and liner being formed from metal and the latter having greater heat transmitting qualities than the former, of a heating element interposed between the shoe and liner, and circuit leads connected to the heating element.

7. An electric vulcanizer having in combination a series of independent heating elements for heating the vulcanizer and material therein and automatic means for independently controlling said heating elements.

8. An electric vulcanizer having in combination a series of independent heating elements and a series of automatic regulators, one for each of said heating elements, said regulators being connected in parallel for independently controlling said heating elements.

9. An electric vulcanizer having in combination two bus wires, a circuit line wire attached to each of the bus wires, a series of independent heating elements connected to one of said line wires and a corresponding series of automatic regulators independently connecting the several heating elements to the other of said line wires.

In testimony whereof I affix my signature in presence of two witnesses.

EVEN J. ROHNE.

Witnesses:
 EVA E. KÖNIG,
 HARRY D. KILGORE.